March 3, 1931.  C. H. SPENCER  1,794,930
WIND DRIVEN POWER DEVICE
Filed Sept. 19, 1928  3 Sheets-Sheet 1

INVENTOR.
CHARLES H. SPENCER
BY 
ATTORNEY.

March 3, 1931. C. H. SPENCER 1,794,930
WIND DRIVEN POWER DEVICE
Filed Sept. 19, 1928 3 Sheets-Sheet 2
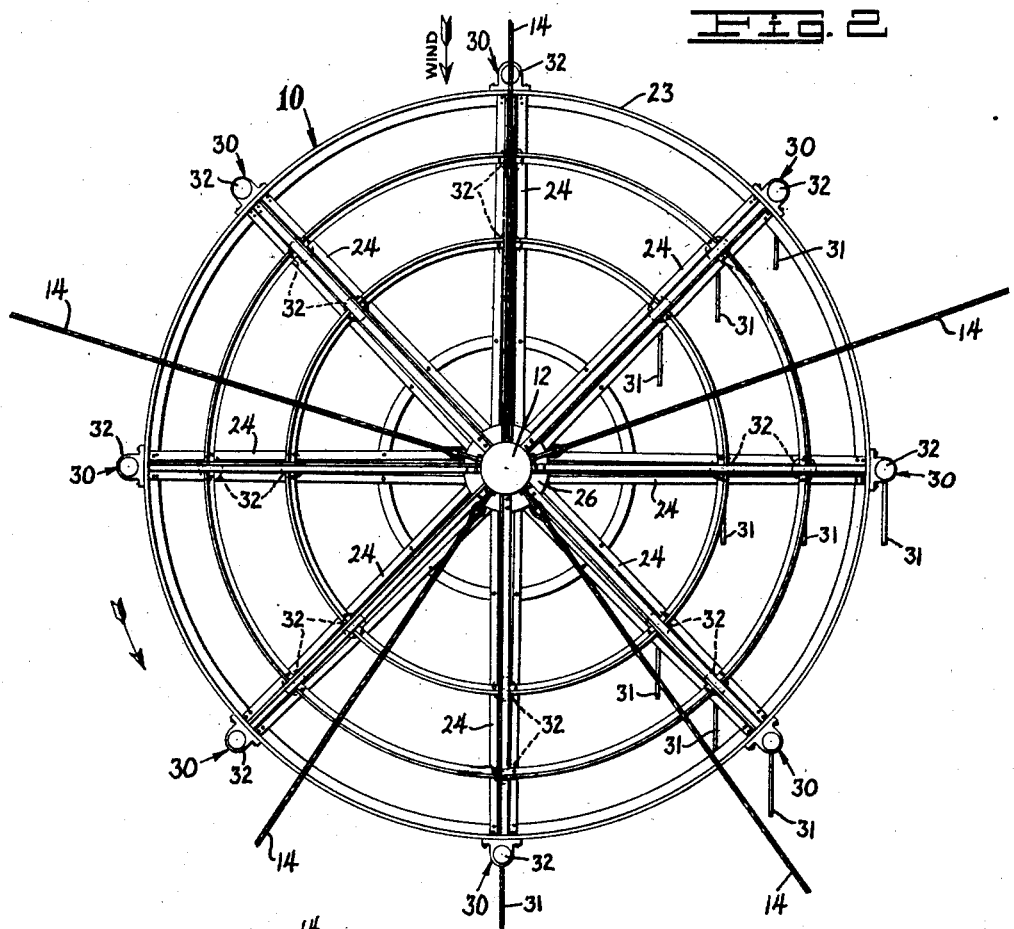
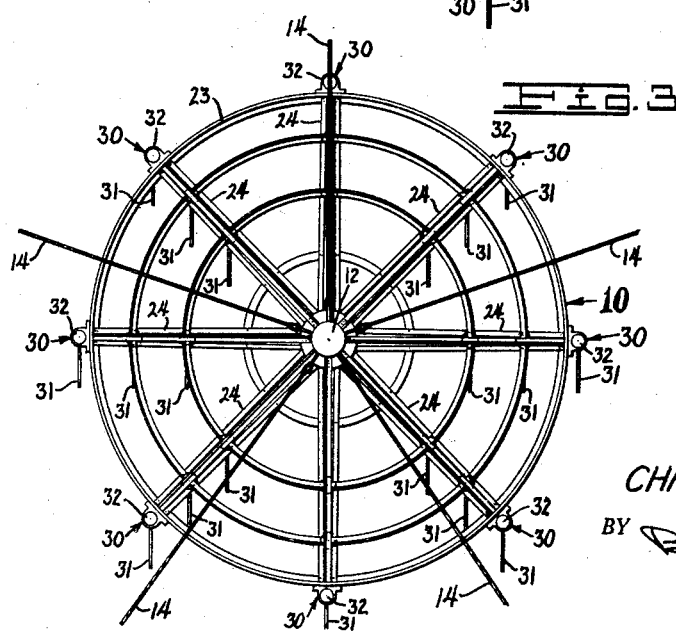
INVENTOR.
CHARLES H. SPENCER
BY
ATTORNEY.

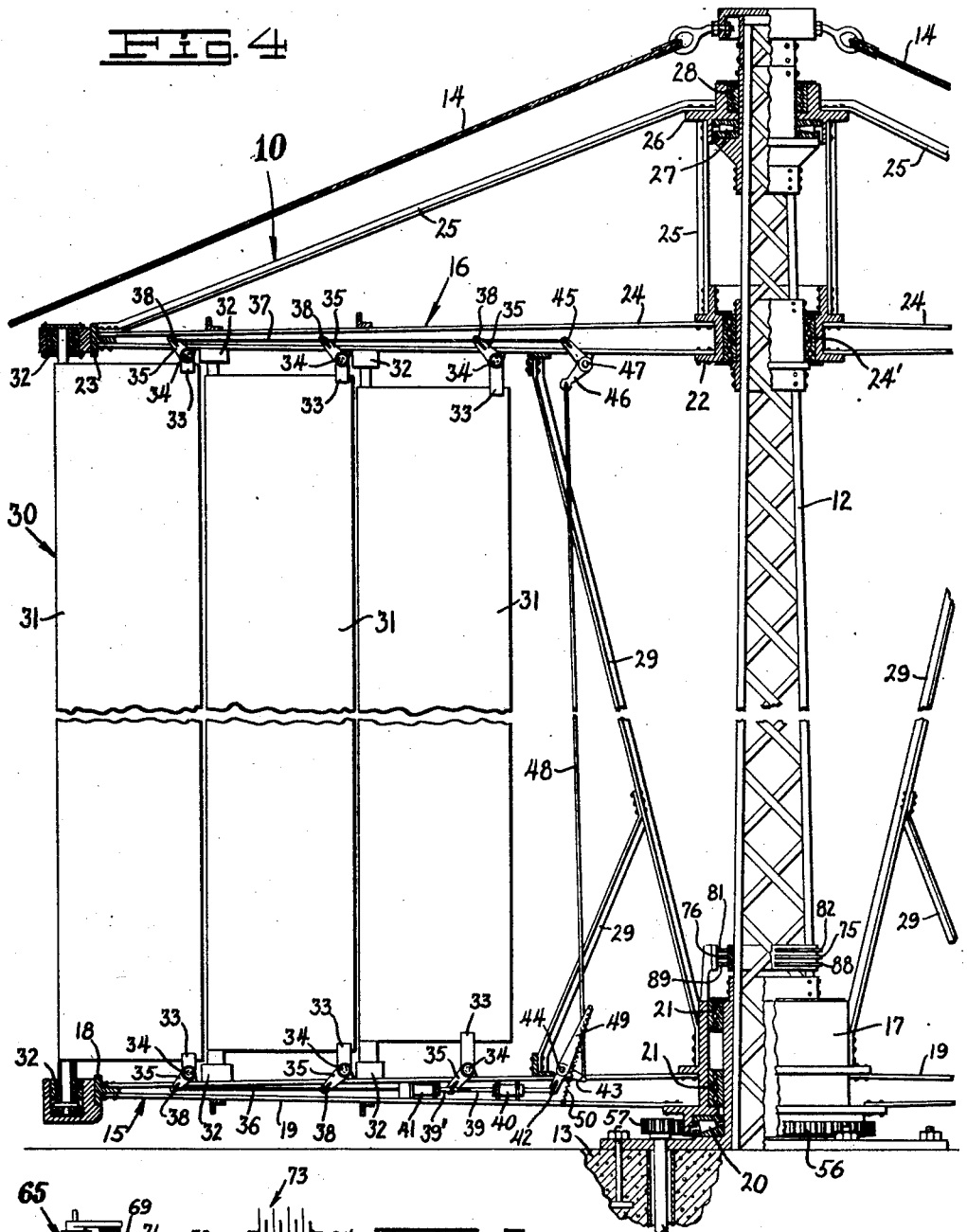

Patented Mar. 3, 1931

1,794,930

UNITED STATES PATENT OFFICE

CHARLES H. SPENCER, OF LOS ANGELES, CALIFORNIA

WIND-DRIVEN POWER DEVICE

Application filed September 19, 1928. Serial No. 306,815.

This invention relates to improvements in wind driven devices.

The general object of this invention is to provide an improved wind driven power developing device particularly adapted for manufacture in large sizes for driving electric generators, pumps, compressors, etc.

Another object of the invention is to provide a device of the class described including wind vanes so arranged and mounted that the wind strikes the faces of the vanes only when the vanes are in a driving position.

A further object of the invention is to provide automatic means for releasing the vanes so that they will be ineffective to drive the device.

Other objects and the advantages of the invention will be apparent from the following description taken in connection with the accompanying drawings wherein:

Fig. 2 is a top plan view of the device showing the vanes adapted to drive the device.

Fig. 3 is a view similar to Fig. 2 on a smaller scale showing the vanes released.

Fig. 4 is an enlarged fragmentary section of my device and

Fig. 5 is a view showing the control governor in elevation and the electrical hook-up in diagram.

Figure 1:
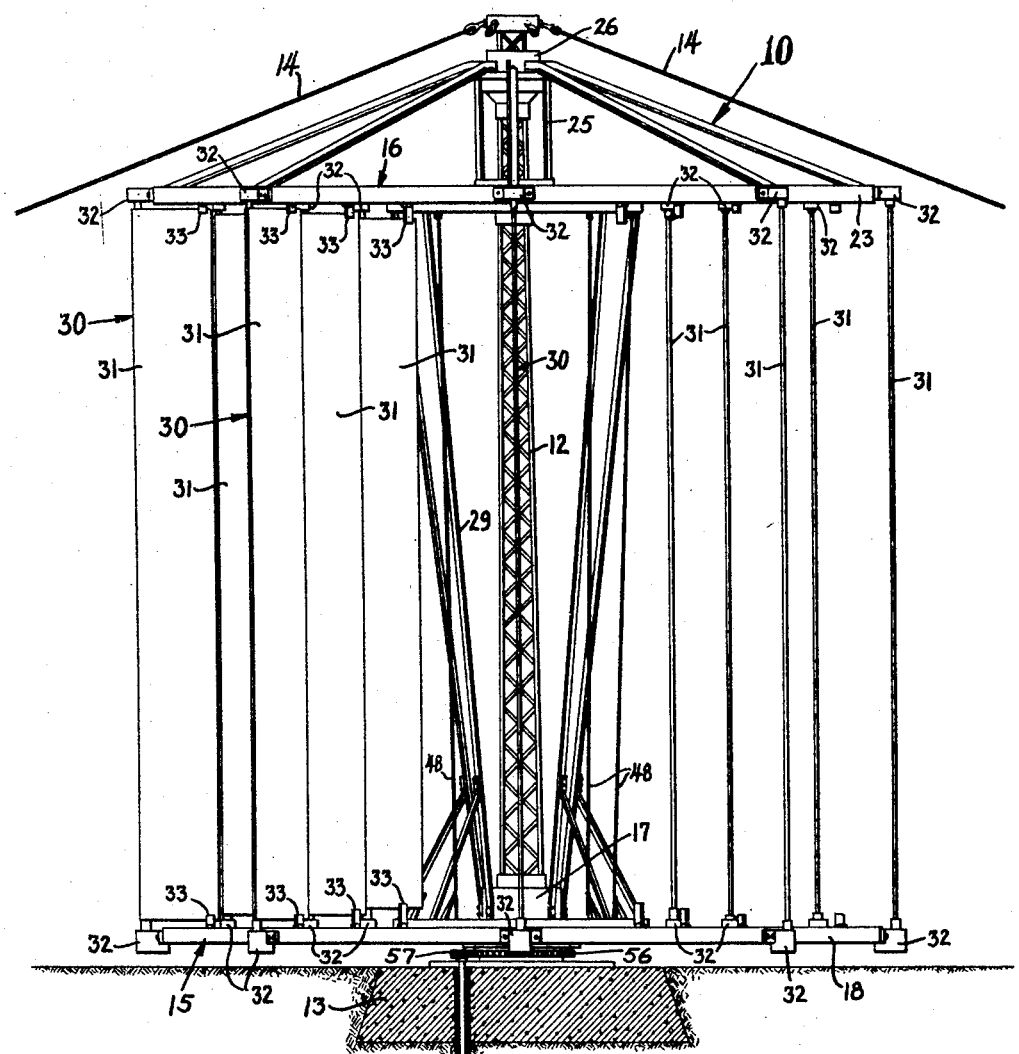
Fig. 1 is an elevation of my invention showing it adapted to drive a plurality of generators.
Figure 1:
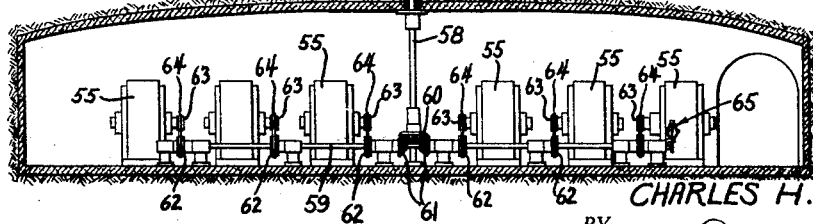

Referring to the drawings by reference characters I have indicated my improved device generally at 10. As shown this device comprises a central standard 12 secured to a base 13 and adapted to be supported adjacent the top by a plurality of guy wires 14 which may be anchored and braced in any desired manner.

A wheel 15 surrounds the standard 12 adjacent the bottom and a wheel 16 surrounds the standard adjacent the top thereof. The wheel 15 includes a hub 17 connected to a rim 18 by a plurality of radially extending spokes 19. The hub 17 is shown as adapted to be supported by an anti-friction thrust bearing indicated at 20 and a plurality of radial anti-friction bearings indicated at 21.

The wheel 16 includes a hub 22 connected to a rim 23 by a plurality of radially extending spokes 24. The hub 22 is adapted to revolve around the standard 12 on an anti-friction radial bearing indicated at 24' and the wheel 16 is shown as suspended by a framework 25 from a member 26 which is supported by an anti-friction thrust bearing indicated at 27, and an anti-friction radial bearing indicated at 28.

The wheels 15 and 16 are preferably connected by a plurality of struts as indicated at 29. Between the wheels 15 and 16 I provide a plurality of vanes 30. Each vane preferably includes a plurality of separate blades 31 pivoted at their outer ends to the wheels 15 and 16 as indicated at 32.

For retaining each of the blades in an operative working position I provide a stop 33 at the top and bottom of each blade and adjacent to their inner edges. The stops 33 are pivoted to the spokes as indicated at 34 and each includes an arm 35. The arms 35 of the lower stops are slackly connected by a rod 36 and the arms 35 of the upper stops are slackly connected to a rod 37 as indicated at 38. The lower rod 36 includes solenoid cores 39 and 39' which are adapted to operate in solenoids 40 and 41 respectively. The inner end of the rod 36 is slackly connected as indicated at 42 to one arm of a bell crank 43 mounted on a shaft 44 and the inner end of the rod 37 is slackly connected as indicated at 45 to one arm of a bell crank 46 which is pivoted as at 47.

The other arms of the bell cranks 43 and 46 are connected by a rod 48. On the shaft 44 I provide a lever 49 having one end of a spring 50 secured to its free end and the opposite end of the spring is anchored to the spokes on the vertical center line of the shaft 44.

Thus the spring 50 retains the lever 49 on which ever side of the center line it is moved.

In operation the free ends of the blades abut the stops 33 and the wind exerts its force against the blades on one side of the device and rotates the device. As the inner edges of the blades come in line with the wind, the wind swings the blades on their pivots 32 so that the pivot edge of the blades is in line with the wind and no force is exerted on the faces of the blades on the side of the device traveling against the wind as clearly shown in Fig. 2. Thus it will be seen that the blades traveling towards the wind on the inoperative side of the device do not offer any resistance. As the device revolves the inoperative blades automatically reset themselves against the stops 33 as they pass from the inoperative side of the device to the operative side.

My improved device 10 may be employed for developing power for any desired purpose but herein I have shown and described it as adapted to furnish power for driving a plurality of electric generators 55. As shown, I provide a gear 56 on the hub 17 which meshes with a pinion gear 57 on a shaft 58. The shaft 58 is adapted to drive a line shaft 59 through the medium of a bevel gear 60 and bevel gears 61 and pulleys 62 on the line shaft are adapted to drive pulleys 63 on the generators 58 through the medium of belts 64.

For operating the solenoids to release the blades 31 I provide an automatic control device indicated generally at 65. This device includes a governor 66 operatively connected to the line shaft 59 by gears 67 and 68 and includes a contact bar 69 which is adapted upon a predetermined position of the governor 66 to bridge a pair of contacts 70 and 71. The contact 70 is connected by a wire 72 to one side of a source of electricity which is shown as a battery 73.

The contact 71 is connected by a wire 74 to an electrical conductive track 75 mounted on the standard 12. A brush 76 mounted on the hub 17 is adapted to contact with the track 75 and has a wire 77 connected thereto from which lead wires 78 connect with one side of each of the solenoids 40. The other side of the solenoids 40 and 41 are connected by lead wires 79 to a wire 80 which is connected to a brush 81 on the hub 17. The brush 81 is adapted to engage an electrical conductive track 82 mounted on the standard 12 and the track 82 is connected by a wire 83 to the opposite side of the battery 73.

Thus it will be seen that when the speed of the device reaches a predetermined point the contact bar 69 of the device 65 will bridge the contacts 70 and 71 and cause the current from the battery to operate the solenoids 40 which will move the rods 36 towards the center of the device. As the rods 36 move thusly they will rock the bell cranks 43 which in turn will, through the medium of the rods 48, rock the bell cranks 46 and move the rods 37 toward the center of the device. As the rods 36 and 37 move towards the center they will swing the stops 33 out of engagement with the blades 31 whereupon the blades are free to swing on their pivots in a complete circle and will at all positions present their pivoted edges to the wind as shown in Fig. 3.

For operating the solenoids 41 to reset the stops 33 I provide a pivoted switch bar 84 connected by a wire 85 to the wire 72. This switch bar 84 is adapted to engage a contact 86 which is connected by a wire 87 to an electrical conductive track 88 on the standard 12 and a brush 89 on the hub 17 is adapted to engage the track 88. A wire 90 is connected to the brush 89 and lead wires 91 connect one side of each of the solenoids 41 to the wire 80.

When it is desired to reset the stops 33 the switch bar 84 is moved to engage the contact 86, thereby causing current to flow from the battery 73 to the solenoids 41 which will move the rods 36 outward and reset the stops 33.

For releasing the stops 33 by manual operation I provide a contact 92 which is connected by a wire 93 to the wire 74 and is adapted to be engaged by the switch bar 84. When the switch bar 84 engages the contact 92 the current will be directed to the solenoids 40 in the same manner as previously described.

My invention as shown and described is adapted for producing a great amount of power and is preferably made very large in size, but of course it will be understood that the device may be made on a smaller scale to produce less power. Also, although I have shown and described my invention as adapted to furnish power to drive electric generators, it will be understood that the power developed may be utilized for any desired purpose.

From the foregoing description it will be apparent that I have provided an improved wind power device which is simple in construction and is highly efficient in use.

Having thus described my invention, I claim:

1. In a wind power device, a pair of rotatable members, a plurality of vanes mounted between said members, each of said vanes being pivoted adjacent its outer top edge in said members, a stop adjacent the top and bottom of each of said vanes, a solenoid associated with each vane, a source of electricity, a core for said solenoid, a governor, means to drive said governor from said wind power device, an electric switch connected with said source of power and said solenoid of each vane, said governor being adapted upon a predetermined speed of said device to close said switch to actuate said solenoid of each vane and means whereby said solenoids upon actuation move said stop to release position.

2. In a wind power device, a support, a frame having a plurality of vanes mounted thereon to rotate about a vertical axis on said support, control means normally arranged to prevent rotation of the vanes in one direction, a governor, means to drive said governor on rotation of said frame, and means including solenoids actuated by said governor for controlling said control means.

In testimony whereof, I hereunto affix my signature.

CHARLES H. SPENCER.